Figure 1:
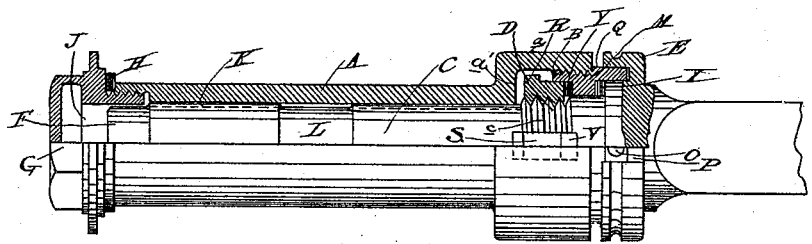

(No Model.)

P. DANSEREAU.
VEHICLE AXLE BOX.

No. 492,146. Patented Feb. 21, 1893.

Witnesses:
James Laurin.
Alp. Walter.

Inventor
Pierre Dansereau
per: J. Emile Vanier
Attorney.

UNITED STATES PATENT OFFICE.

PIERRE DANSEREAU, OF MONTREAL, CANADA.

VEHICLE-AXLE BOX.

SPECIFICATION forming part of Letters Patent No. 492,146, dated February 21, 1893.

Application filed September 9, 1892. Serial No. 445,462. (No model.)

*To all whom it may concern:*

Be it known that I, PIERRE DANSEREAU, a subject of the Queen of Great Britain, residing in the city and district of Montreal and Province of Quebec, Canada, have invented certain new and useful Improvements in Axle-Skeins; and I do hereby declare the following to be a full, clear, and exact description of the invention, such as will enable others skilled in the art to which it appertains to make and use the same.

My invention has reference to a new method for securing the skein in position and consists in two nuts on to one of which the skein is screwed and the other is screwed on the journal and butts against the former so as to hold it in position, the whole as explained hereinafter.

The object of my invention is to provide an easy running axle that will keep its oil.

Referring to the drawings similar letters refer to similar parts throughout the several views.

Figure 2:
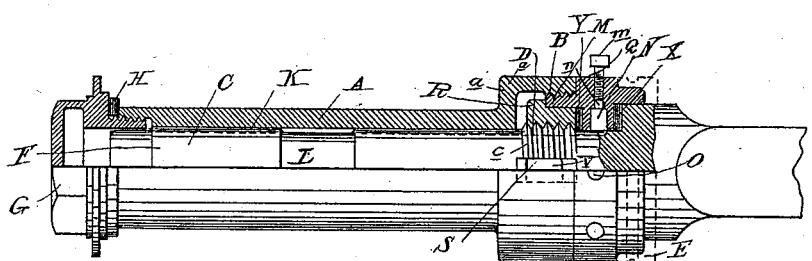
Figure 3:
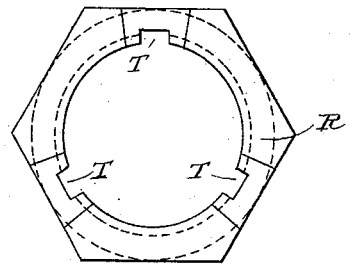

Figure 1 is a side elevation shown half in section of my invention. Fig. 2 is also a side view shown half in section of my invention showing a difference in form. Fig. 3 is a front view of one of the nuts.

A is the skein proper which is provided with threads at B, while C is the journal provided with threads at D and the ordinary sand band E. The end F of the axle skein A is provided with a screwed cover G having a washer H inserted between it and the skein A so that no oil can leak out. This cover G is made so as to leave a space between it and the end I of the journal C which serves as an oil reservoir J. The journal C is provided with the ordinary oil grooves K and L.

Now to secure the skein A in position onto the journal C, I first put on the nut M which can be made in section either as shown in Fig. 1 or Fig. 2, only in the latter case I make an annular oil reservoir N into which I introduce the oil through the hole $n$ closed by the set screw $m$, the only difference between the two forms being that to screw on or off the axle on the one shown in Fig. 1 a pin is inserted into the hole O, the sand band E being cut away at P for this purpose and then simply unscrewing or screwing on the skein A, while in the one shown in Fig. 2 the sand band E is not cut away but the portion Q (Fig. 1) is made wider and higher so as to come flush with the portion $a$ of the skein A and here make its surface either of flat sides or round so as to use a spanner wrench to screw on or off the skein A. The sand band E could of course be entirely dispensed with as shown in Fig. 2 the same band E being here shown in dotted lines. After the nut M is in position I then screw on to the journal C the nut R the journal C being provided with the threads $c$ for this purpose and when it is snug up I introduce the key S which fits into any one of the slots T, in the nut R, which happens to be opposite the slot V on the journal C, this key S being kept from coming out by it touching the shoulder $a'$ of the skein A. This being done the skein A is then screwed on.

The washers X and Y serve to take up any lost motion and the one X also serves to keep in the oil and keep out the dust. Any wear on these washers X and Y can be instantly taken up by simply taking off the skein A, taking out the key S and then screwing up the nut R of the required amount and then inserting the key S in the required notch again.

Having described my invention, what I claim, and desire to secure by Letters Patent, is—

In an axle skein, the combination, with the axle provided with the screwthreaded portion $c$, of the nut M, the washers X and Y one on each side of the said nut, the nut R engaging with the screwthreaded portion $c$ and provided with a key for securing it in position, the skein screwed onto the nut M and having a shoulder $a'$ adapted to bear against the end of the said key, and a hollow cap secured to the free end of the skein and inclosing the end of the axle bearing, substantially as and for the purpose set forth.

In testimony whereof I have affixed my signature in presence of two witnesses.

PIERRE DANSEREAU.

Witnesses:
   JAMES LAURIG,
   F. X. MALO.